United States Patent
Gibbens et al.

[11] Patent Number: 5,877,842
[45] Date of Patent: Mar. 2, 1999

[54] DIGITAL DAILIES

[75] Inventors: John Howell Gibbens; Geoffrey George Rubay, both of Glendale, Calif.

[73] Assignee: Daily Disc Licensing, Inc., Glendale, Calif.

[21] Appl. No.: 818,332

[22] Filed: Mar. 14, 1997

[51] Int. Cl.[6] .................................................. G03B 31/00
[52] U.S. Cl. ............................................. 352/12; 352/20
[58] Field of Search .................................. 352/12, 19, 20, 352/31, 32, 33

[56] References Cited

U.S. PATENT DOCUMENTS

| | | |
|---|---|---|
| 3,999,842 | 12/1976 | Neiderhauser et al. . |
| 4,204,751 | 5/1980 | Game et al. . |
| 4,215,920 | 8/1980 | Buter . |
| 4,385,814 | 5/1983 | Elliott ........................................ 352/20 |
| 5,155,510 | 10/1992 | Berd . |
| 5,386,255 | 1/1995 | Beard et al. . |
| 5,450,146 | 9/1995 | Chedville et al. . |
| 5,594,513 | 1/1997 | Stone et al. ............................... 352/12 |

*Primary Examiner*—Russell Adams
*Attorney, Agent, or Firm*—Sanford Astor

[57] ABSTRACT

A system to create, for screening purposes, an adjustable, pre-selectable synchronous relationship between motion picture film segments and their matching audio files, by transferring the audio to a digital format, storing the audio files on a portable or removable computer storage device, such as a compact disk, and utilizing a computer program to define and maintain the synchronous relationship. The system provides the ability to screen continuously, multiple rolls of film each having a plurality of film segments with the appropriate synchronized digital audio files.

54 Claims, 4 Drawing Sheets

DIGITAL DAILIES

BACKGROUND OF THE INVENTION

Existing technology for the uninterrupted screening of multiple rolls of motion picture film requires synchronization of the film with the associated digital audio by either the application of the digital audio data to the film itself or by the application of a special time code directly to the film. Examples of such systems are described in U.S. Pat. Nos. 5,485,232 and 5,450,146. These systems are used during the printing of the finished film for theatrical release. All rely on a sync relationship between picture and audio that is both pre-established and permanent. No means have been provided to quickly synchronize or alter the synchronization of random pieces of picture and sound, such as are found in the assembly and viewing of "Dailies" which are the printed pieces of footage that represent the results of one day's filming of various scenes.

Dailies are printed and viewed as soon as possible (usually within 24 hours) by the Director or other film personnel in order to be sure that no problems have occurred which would require the scene to be reshot. These scenes are typically assembled in a haphazard manner and a method of randomly accessing the audio portion of each scene, matching it to the appropriate film footage, and then quickly synchronizing sound and picture, is needed. Furthermore, it is desired that multiple rolls of these scenes be screened continuously, by switching back and forth between multiple projectors (usually two).

Presently, the synchronization of picture and sound for viewing Dailies is all done manually with splicers and adhesive tape. The Dailies are viewed by simultaneously running a reel of film and a separate reel of sound tape which have been hand synchronized.

To describe in more detail the systems and methods currently in practice, a few terms must be defined. A "Scene" is commonly understood to mean a particular portion of a film's script. Thus Scene 93 may be the Car Chase and Scene 54 may be the Love Scene. A "Take" is one recorded performance of a Scene and each Scene may have many Takes.

The "Clapper" or "Sticks" refers to the brightly painted pieces of wood that are brought together with a loud bang at the beginning of each Take. The filmed image of the Sticks coming together is used in conjunction with their recorded sound or report to provide a common audio and visual reference point for synchronization.

As a film is being shot, only selected Takes are chosen by the Director to be printed. These Takes are circled on the camera reports that are sent to the film laboratory along with the original negative. The Production Sound Mixer also indicates by the "Circled Takes" on his sound report, which Takes are to be transferred from the production sound masters to perforated magnetic film.

When the negative arrives at the film laboratory it is known as a "Camera Roll". The Camera Rolls are developed and then physically cut, with all of the circled takes spliced together into "Lab Rolls". These Lab Rolls are approximately 1000 feet long. A color corrected "Work Print" is made from each Lab Roll. The Work Print is then sent to the Assistant Editor in the Editing Room.

While the negative is being processed, the production sound masters are being transferred at a separate facility. The production tapes are most commonly DAT (Digital Audio Tape), but analog ¼" tape is still used, and occasionally other recording media as well. Most production recording is Monaural or 2-track Stereo, but can be 4, 8 or more channels. The sound for the Circled Takes is transferred monoaurally to perforated magnetic film, also known as "Stripe". Any stereo or multi-track elements are usually combined, however the production sound mixer may request that only one side of a stereo pair or selected channels of a multi-track be transferred. After the sound is transferred, the Stripe is then also sent to the Editing Room.

When the Work Print arrives at the Editing Room, the Lab Rolls are rearranged into "Dailies Rolls". This is done because the Lab assembled their Rolls without regard for sequencing. The Lab simply splices together the designated Takes until they have a Roll approximately 1000 feet long and then they start on a new Roll. One Lab Roll may contain Takes from both Scene 93 and Scene 54. The Assistant Editor wants Dailies Rolls that contain Takes from only one Scene.

A "Head Leader" is attached to each Dailies Roll. This is done to protect the Work Print and to provide a standard reference frame from which the Dailies Roll is measured and played. The S.M.P.T.E. (Society of Motion Picture & Television Engineers) Standard Head Leader is the industry standard. It measures exactly 12 feet from the specific frame marked, "Picture Start", to its end which is attached to the first frame of action (F.F.O.A.) of the Work Print.

After being leadered, the Dailies Roll is then edge coded by a machine that prints consecutive numbers on the film at 1 foot intervals. The Acmade® coding machine is the industry standard. Using a ribbon, it prints eight characters between the perforations on the side of the film. In standard practice, there is a three digit numeric prefix, an optional letter (A through E, plus M, P, W and X), and a four digit numeric suffix. Thus 000 0000, 123A4567, 054 1000, and 999X9999 are all possible combinations. The suffix number automatically increases with each foot of film that is run through the machine.

The assistant Editor codes the Dailies Rolls so that the code prefix indicates the Scene contained in that Roll. For example, the Roll containing Sc. 53 would be coded 053 1000. A Scene may fill several Dailies Rolls, so the first roll is given the suffix 1000, the second roll 2000, etc.

The coding machine is always started on the "Picture Start" frame of the standard 12 foot leader, so that the first frame of action in Roll 054 1000 would be coded 054 1012, which is 12 feet: from the "Picture Start" frame.

As the Dailies Rolls are built, the Assistant Editor enters into a log book the relevant information for each Take on the Roll. Such information includes, for each Take on the Roll, the Scene and Take number, the first and last Acmade code number, the first and last Key Code number, (a human readable number placed of the edge of the negative at the time of manufacture), the Camera Roll number, the Lab Roll number, the Sound Roll number, a description of the Take, and the date that it was shot.

The next step is to put the Sound into synchronization with the Picture. First, the Assistant winds through the Work Print and finds the Clapper Frame for each Take on the roll. This is the first frame of film that shows the Clapper Boards fully closed. For each Take, this frame is then clearly marked with a grease pencil, a large "X" being the standard mark. The Scene and Take number are also written on the film in large print adjacent to this "X". Next, the roll of Stripe (perforated magnetic film) is listened to and the exact point of the first modulation of the sound of the Clapper closing is found and marked on the Stripe with a felt pen, for each Take.

The Work Print and Stripe are then run through a "Synchronizer", a device with toothed wheels that measures the two pieces of film simultaneously and insures that exactly the same amount of each passes through. The mark on the Stripe audio track indicating the Clapper's report is brought into alignment with the mark on the picture indicating the first frame of the Clapper fully closed. This is always done by manipulating the length of the Stripe, either by removing excess film or adding silent leader.

Once the Stripe for each Take on the Roll is put into sync with the corresponding Work Print, it is checked on a film viewing machine, such as a KEM® flatbed viewing and editing machine. This must be done because occasionaly Takes are shot in which the Clapper cannot be seen or in which its report is inaudible. In such cases, no formal sync relationship exists and one can only be found by viewing the Take and searching for an alternate reliable sync reference point. These are often created by chance, such as when an actor closes a door or puts a glass down on a table. Events such as these are reliable in that they result in an audible report that may be associated with a unique frame of film. Lacking these, spoken dialogue may be used to find the correct sync relationship, with hard consonents sch as "P" or "T" being preferred because of the obvious lip movements associated with them. This last method is known as "Lip Synching" and is often quite subjective.

After they are synchronized and checked, the Dailies Rolls and Stripe are taken to a screening room and projected by a system capable of interlocking the two pieces of film. As stated before, it is desired that the Dailies be shown without interruption between Rolls. Therefore, two motion picture projectors and two magnetic tape players are required.

After a screening of these Dailies by the Director, and/or other personnel, the separate Rolls of picture and sound are sent to a Telecine facility and transferred to videotape. Usually the final editing of the film is done on a computer and the Stripe audio track is never used again.

SUMMARY OF THE INVENTION

The previous detailed description of the process presently employed throughout the industry is necessary to understand the improvements accomplished by the present invention. A description of the assembly and synchronization of the Dailies utilizing the system of this invention follows.

The original camera negative is processed as before and the Work Print is sent to the editing room.

The Production Sound Tapes are sent to a facility where the Circled Takes are loaded onto a computer hard drive using a digital sound editing work station and software, such as Pro-Tools®, one of many digital audio work station systems now commonly in use in the industry. Here, the source audio from the production sound masters is converted to digital files and stored on the computer.

At the workstation, in addition to the audio files, a database is placed on the hard drive that contains a list of the audio files that have been loaded. The database can also store a message, if desired, related to each audio file. With the audio still in the computer work station, the person who is performing the loading finds the Clapper Report, or other sync reference point within the digital audio file for each film segment, and identifies it relative to the beginning of the audio file. He then stores this position information in the database. Each audio file now has a unique reference point for synchronization, specifically a single digital sample that may later be related to a unique frame of motion picture film.

After all of a day's Circled Takes are thus loaded and marked, all of the audio files and the database containing the position information of each sync reference point for each audio file are transferred to a portable or removable computer storage device, such as a compact disk (CD).

The database is further able to store an offset, measured in digital samples, for the sync reference point of each audio file. This may be necessary because the specific sample within the audio file that was initially chosen as a sync reference point by the person who created the disk, may not be the reference point preferred by the Assistant Editor who later synchronizes the audio file. Therefore, the Assistant Editor must have the ability to select another sync reference point. An offset for each audio file, measured in digital samples, and placed in the CD's database, provides the ability to change each audio file's sync reference point without losing the original sync position information. The Assistant Editor will add this and other information to the database later.

The portable computer storage device, such as a recordable CD, is then sent to the Editing Room. The Assistant Editor then uses hardware and software (hereafter described) to create sync relationships between the audio files stored on the CD and the Work Print. Use is made of film measuring means creating position signals, such as standard "biphase signals" to maintain these sync relationships. After the audio files on the CD are matched to the Work Print, the two can be played in sync in any screening room or theater equipped with a basic system. Biphase signals, sometimes called "tach pulses", measure the passage of film. Standard biphase signals are 10 pulses or signals per frame. When motion picture film is run at standard speed, 24 frames per second, there would be 240 biphase signals per second.

The system may also be equipped to read standard barcode data from the film (a process described below), and then collate this data with additional data related to the film entered by the Assistant Editor. This data may be manipulated to produce a variety of logs and reports. Also, the barcode data may be used to further automate the playback of the Rolls through the use of a barcode reader mounted on the film projector. By identifying barcode data unique to each Roll of Dailies, the system will automatically find and play the correct audio on the CD.

The system allows one CD to be synchronized with two or more projectors, for the uninterrupted viewing of the Dailies Rolls. This is also necessary in order to view the film during the later stages of editing, when footage is taken from the Dailies Rolls and assembled into reels of edited Work Print. It is essential that during these screenings of cut footage, multiple film projectors "Change Over" between one another. In other words, the second, third and later reels of film must begin to be projected at the exact moment the previous reel ends. As it is being edited, a typical feature length motion picture consists of ten to sixteen reels of Work Print, and these Change Overs between reels appear as ordinary cuts, or changes of Scene, within the movie. Since the motion picture, at this stage, is still a work in progress, these reels are not yet approved by the Director for final printing. During the final printing process the audio for the reel is applied either directly to a film print of the reel., or a special time code for the reel is applied, as described in U.S. Pat. Nos. 5,484,232 and 5,450,146, previously mentioned. Therefore, a system is desired whereby multiple reels of Work Print may be screened continuously, without interruption, and synchronously with the appropriate digital audio files, as with the Dailies.

The audio files can also be transferred easily from the CD to a computer hard drive for use in digital editing workstations by the Film Editor and Sound Editor.

OBJECTS OF THE INVENTION

Accordingly, several objects and advantages of the invention are as follows:

It is an object of the present invention, called the "Digital Dailies" system, to create a method to establish adjustable relative relationships between random pieces of motion picture film and audio in the form of digital audio files.

Still a further object of the invention is to provide a system for film post-production, for synchronous sound playback of multiple rolls of film, including but not limited to, the screening of Dailies and the screening of assembled footage for preview audiences.

It is a further object of the invention to provide the ability to collect, collate, store and manipulate data related to the film by using the standard latent image barcodes which are presently imprinted on the film negative at the time the raw film stock is manufactured.

DETAILED DESCRIPTION OF THE INVENTION

Figure 1:
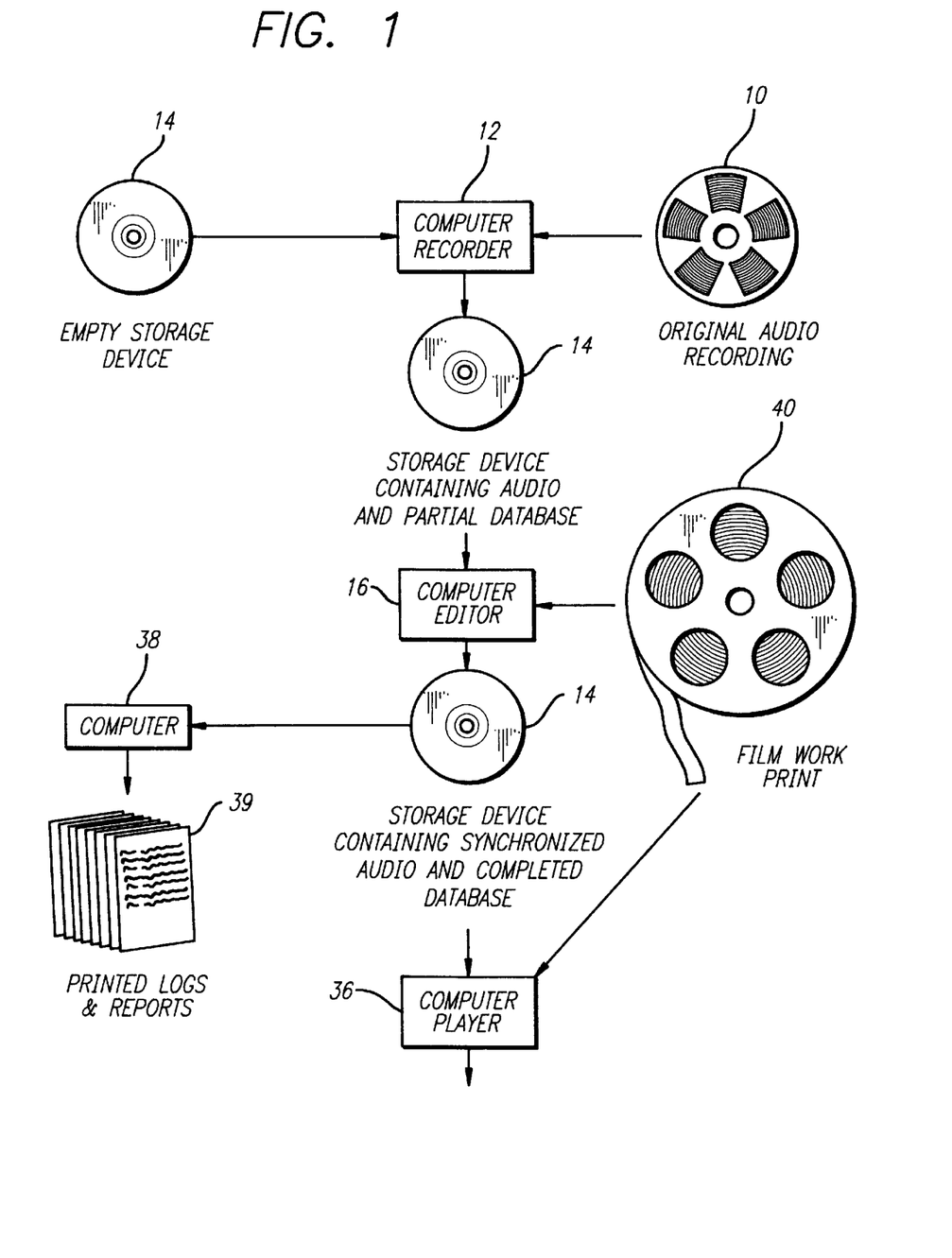
FIG. 1 is a block diagram of the system of this invention.

Referring now to FIG. 1, audio from the original production sound masters 10 is converted by a computer/recorder 12 into a standard format digital audio file. The audio from each of the Circled Takes (those specified for printing) is transferred in this manner to the hard drive of computer/recorder 12, each Take becoming a separate audio file. If a Take is a multi-track recording, all requested channels are loaded, as well as any desired combined channels. For each channel and/or combination of channels there is a separate audio file.

In addition, computer/recorder 12 contains software to create a database file on the hard drive. Into this database is entered the name of the project, the number of the disk, a list of the audio files on the disk, and additional information related to the audio files, such as their original Sound Roll number and the date they were shot (filmed). The database can also store a message, if desired, related to each audio file.

Figure 2A:
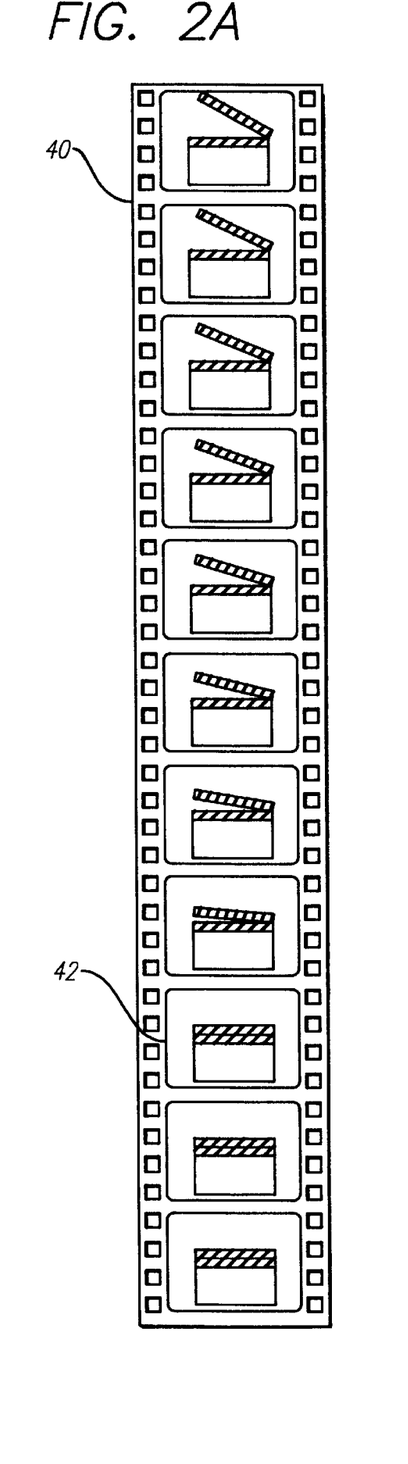
FIG. 2 is a depiction of two pieces of motion picture film.
Figure 2B:
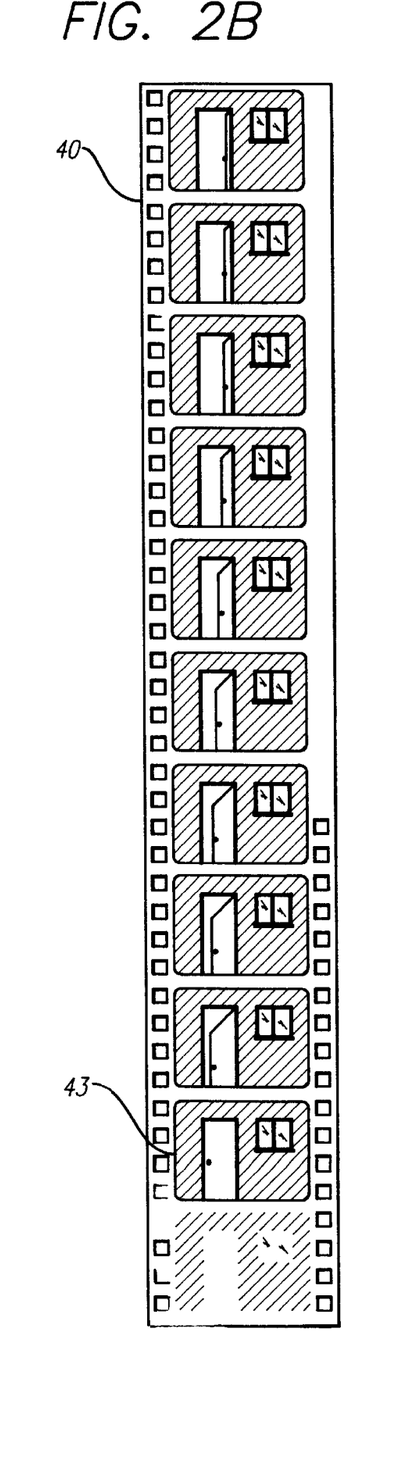

Each audio file is then monitored and the exact position of a common audio and visual sync reference point is determined. The standard sync reference point for Dailies is the Clapper, previously described and now shown in FIG. 2A, which depicts a section of the film Work Print 40 and shows that there is a specific frame 42 which is the first frame that shows the Clapper fully closed. Frame 42 is synchronous with the first modulation of the Clapper's Report located within the corresponding audio file. Also shown in FIG. 2B is an example of an alternate sync reference point, frame 43, being the first frame in which a door is completely closed, who's audible report can be used, if the Clapper Report is not usable for any reason.

Once a sync reference point is found within each audio file, its position is determined by the user and stored in the database by computer/recorder 12. This position information is simply the distance from the beginning (first digital sample) of the audio file to the first sample of the sync reference point as measured in digital samples, there being typically 48,000 digital samples per second. In addition, any comments such as, "Sync to Door Close" or "Use 2nd Clapper" can be added to the database information.

In the preferred embodiment, the digital audio files and the database are then copied by transfer to a blank portable or removable computer storage device, such as a recordable compact disk (CD) 14, although any portable computer storage device could be utilized, such as a DVD or a removable hard drive. One CD, commonly in use today for instance, will store as much audio as 5.9 rolls of the Stripe presently used, each roll of Stripe being 2000 feet long. The price of Stripe is about $46.00 per roll, a total of $271.40 to hold as much information as one $8.00 CD. The Stripe is also heavy, cumbersome and expensive to ship. 5.9 rolls of Stripe weigh about 53 pounds, compared to one ounce for a CD. Thus, there is an immediate saving in both basic cost and shipping cost as well as manpower needed to transport the audio files.

The database may also contain, for each audio file, an offset for the audio sync position information. This offset is a measurement, in digital samples, that may be added to, or subtracted from, the sync position information for each audio file. This gives the user of the system the ability to locate and store a sync reference point for each audio file that is different than the one initially chosen. By defining the position of this new sync reference point, as being relative to the original sync reference point, the original sync reference point need not be changed.

CD 14, now containing the audio files and partial database, is transported to an editing room which has a computer/editor 16. In computer/editor 16, sync relationships are created between the film segments and the audio files on CD 14. The information for these relationships is added to the database already present on CD 14.

Figure 3:
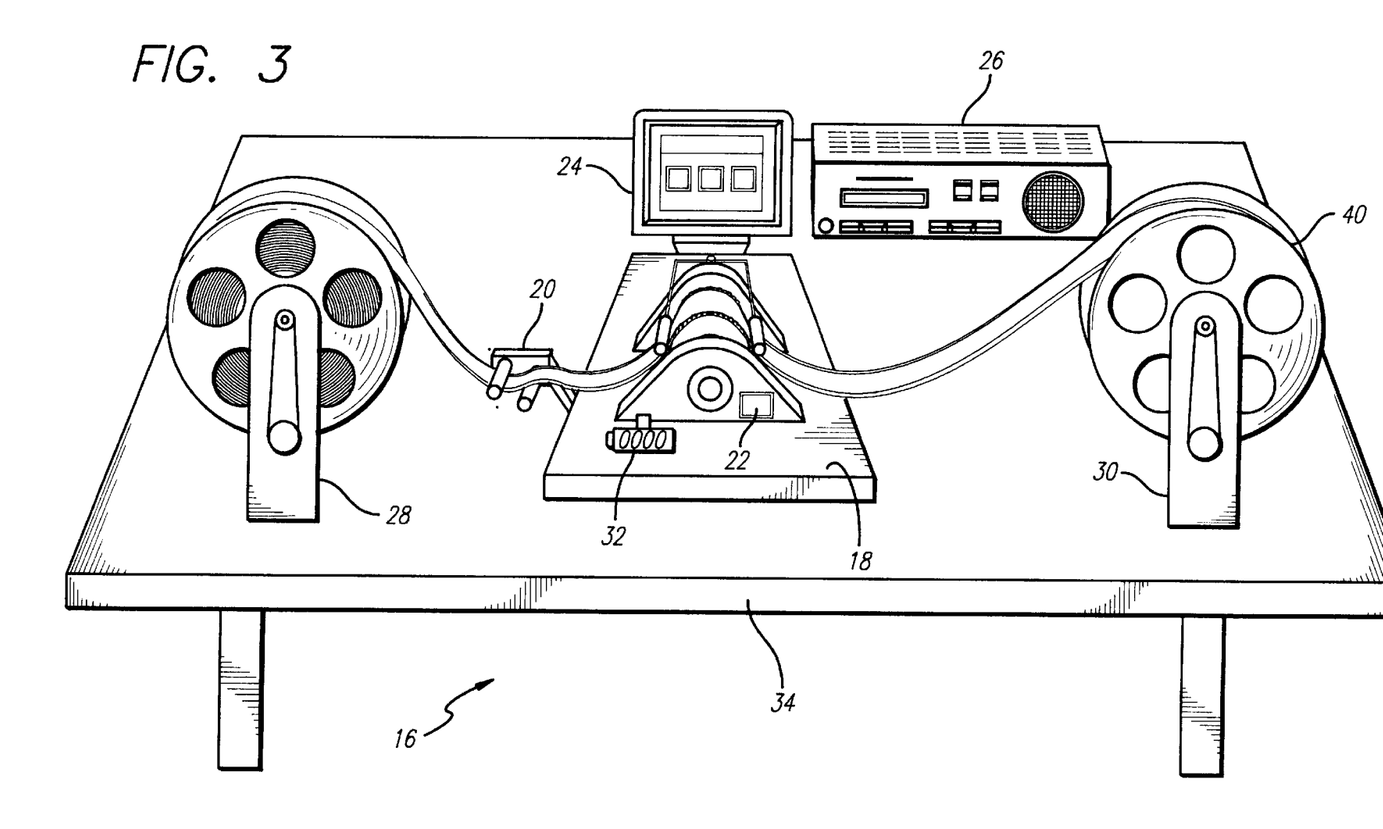
FIG. 3 is a depiction of the synchronizing hardware set-up.

Computer/editor 16 comprises the synchronizing hardware that is used by each production using the system of this invention and comprises, as shown in FIG. 3, at least one film synchronizer 18 with an optional barcode reader 20, a biphase signal generator 22, and a data input interface 24 such as a computer keyboard and monitor or a touch screen, as depicted in FIG. 3. Data input interface 24 is mounted near synchronizer 18 and is used to update the database on CD 14. In addition, there is at least one CD player/recorder 26 with software to read and input data to update the audio file database on CD 14.

Manual rewind 28 includes a spindle with attached hand crank which holds the reel of Work Print 40 that is being fed into barcode reader 20 and synchronizer 18 with biphase signal generator 22. Manual rewind and reel 30 collects Work Print 40 that has passed through barcode reader 20 and synchronizer 18 with biphase signal generator 22. It is seen that Work Print 40 travels from left to right. All of these items, along with optional standard mechanical footage counter 32 are mounted on work table 34.

Player/Recorder 26 contains a biphase signal reader and a barcode reader for reading the biphase signals and the barcode data generated by barcode reader 20 and biphase signal generator 22. It also contains hardware and software for entering information onto the database on CD 14 and playing the audit identified by the CD's database. It is also capable of inputting information to the CD database through data input interface 24. For monitoring, Player/Recorder 26 has a small speaker next to the CD drive as well as a headphone jack and volume knob. The rear of Player/

Recorder 26 has connections for signals from biphase generator 22, barcode reader 20 and data input interface 24, as well as audio line-out jacks for the audio signal.

In addition, there will optionally be a flatbed editing machine (not shown), such as a "KEM", an industry standard, also with a biphase signal generator, data input interface and barcode reader which all operate in the same manner as described for the equipment on work table 34 except that the film may be viewed on the KEM screen. The flatbed is used to check Rolls, if desired, by actually viewing them and to visually synchronize (Lip Synch) Takes, in the event that the Clapper is not visible or its report inaudible.

To further describe the process, it is now assumed that the Assistant Editor has on work table 34 a Dailies Roll of Work Print 40 that has had the Clapper Frames 42 for each Take marked with grease pencil. Next to this mark is usually written, in grease pencil, the Scene and Take number. The Assistant puts the Dailies Roll into the biphase signal (and optional barcode reader) equipped synchronizer 18, winds down to a selectable reference frame, usually the Picture Start mark (the Head Leader), and zeroes the optional mechanical footage counter 32 on synchronizer 18. The optional mechanical footage counter is a method to check the computer footage count against a purely mechanical device for confirmation. Since standard motion picture film has 16 frames per foot, the biphase signals at 10 pulses per frame can also measure the passage of film in feet and it is simple matter for the computer to convert the biphase signals to feet and to display the information if desired.

The Assistant then places the appropriate CD 14 into player/recorder 26. The project's title and the CD's number contained in the CD's database appear on touch screen visual display 24, or on a separate monitor if a keyboard is used.

The Assistant then creates a "Virtual Roll" in the CD's database. This Virtual Roll is the set of audio files and their respective sync reference points that are matched to the specific Takes and their respective sync reference points in the Roll of Work Print currently in synchronizer 18. The Virtual Roll is given the same name as the Dailies Roll, for instance 054 1000.

Once the proper Virtual Roll name is entered, it is standard practice in the industry, for the Assistant to roll down 12 feet in synchronizer 18, from the Picture Start frame of the leader to the first frame of action (F.F.O.A.) of Work Print 40. As the Assistant rolls the film forward through synchronizer 18 from the Picture Start frame to the F.F.O.A., biphase signals are being sent to and received by Player/Recorder 26 from biphase signal generator 22. The biphase signal information provides an exact measurement of the distance between the Picture Start frame and the F.F.O.A. This position, measured in biphase signals from the Picture Start frame, is entered into the database. In addition, barcode data fed by barcode reader 20 (if present) is also sent to Player/Recorder 26. The barcode information from Work Print 40 also measures the same distance and the barcode position information is also entered into the database on CD 14.

At this point the Assistant looks down at Work Print 40 in synchronizer 18 and sees which Take is first on the Roll. The Assistant then brings up a screen (or screens) on data input interface 24 that display a list of all of the audio files on CD 14. There is also a menu selection available for MOS (silent) scenes and one to indicate the end of the roll. It is here that the sync relationship is established between Work Print 40 and the digital audio files via the biphase signal information and, if present, the barcode data.

With synchronizer 18 at rest on the first frame of any given Take within the Reel, the Assistant Editor selects the appropriate audio file for that Take. In so doing, the Editor instructs the computer to begin playing audio from the selected audio file at that specific point (the first frame of any Take) in Work Print 40. The Editor then rolls the film forward, causing biphase signals and/or barcode data to again be sent from biphase signal generator 22 and/or barcode reader 20 to Player/Recorder 26, stopping at Clapper Frame 42 (already marked by grease pencil) and inputs that position onto the database on CD 14, measured in biphase signals and/or barcode from the Picture Start frame, using data input interface 24. In so doing, the Editor associates a specific frame of film, in this example Clapper Frame 42, with a specific audio sample (the Clapper Report) that is located within the audio file that was just chosen. Now a relationship has been established in the database between a common visual and audio reference point. In this example, the visual reference point is Clapper Frame 42 measured in biphase signals and/or barcode data from the Picture Start Frame and the audio reference point is the Clapper's Report, whose position, in audio samples fom the start, was found and stored in the database at the time CD 14 was created After the common sync reference point is found and stored by the Assistant Editor, the next Take is chosen and the process repeated for each Take until the end of the Roll.

The above stated process represents the primary interface between the Assistant Editor and the system during the course of a normal day's work. A very fast sequence is established of selecting a Take, entering into the database the position at which it begins, and its sync position, then going on to the next Take. This routine continues until the "End Of Roll" selection is made, that is, the last frame of picture on the Roll is marked and that position is input to the database on CD 14.

The system includes the ability to edit the information if a Take was put into sync incorrectly during the building of the Roll or could not be put into sync because the Clapper was missing. In such cases, the common sync reference point may be selected from any event that generates a common visual and audio signal, such as a door closing, a glass being set down or a spoken hard consonant. As previously described, the audio sync reference point was pre-selected by the person who loaded the disk. If editing is required, these Takes are synchronized using a film viewing machine such as a "KEM" flatbed, as previously described. The Dailies Roll is threaded on a "KEM" equipped with a biphase signal generator and/or barcode reader and CD 14 is placed into a Player/Recorder such as 26. The Assistant Editor can view the Roll and adjust the position of the audio relative to the picture using a data input interface such as 24. This adjustment is made by changing the sync reference point on the film by simply selecting a different frame to relate to the sync point within the audio file. Alternatively, a specific frame or sync point in the film may remain constant and the adjustment in the relationship can be made by changing the sync point of the audio file via an offset entered in the database. The Assistant Editor can also play the Take after each adjustment to verify that the sync is proper.

The common audio visual reference point can be any point in the sound and any place in the film as chosen by the Editor. This decision can be subjective. For instance, in a scene having only an airplane flying by, the sound of the airplane can be started at one of many different points, to be determined by the Editor. The system of this invention allows the Editor to choose that sync point or to adjust the sync point that was chosen at the time the CD was made. Another edit option allows a Take to be appended to a Roll after it has been built and then again entering the "End of Roll" instruction to the database. In this case, the audio file would either have to already be on the CD or the CD would have to be returned to a computer/recorder 12 to add the new audio file.

Figures 4, 5:
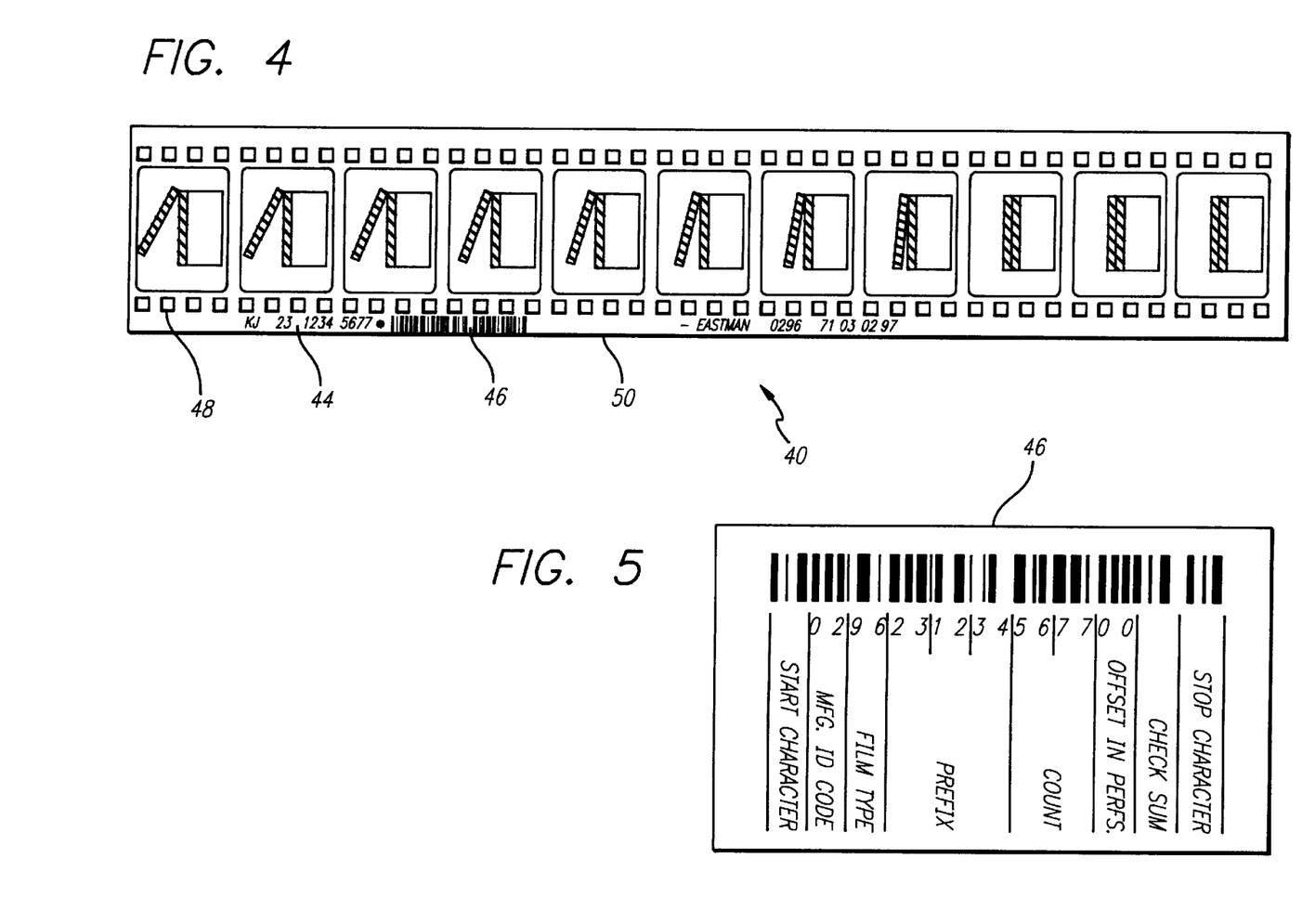
FIG. 4 is a representation of a piece of motion picture film.
FIG. 5 is an enlarged representation of the film.

Referring now to FIG. 4 there is shown a piece of motion picture film 40 as presently manufactured. All motion picture film manufacturers now place barcode information on the film at the time it is manufactured. For instance, Eastman Kodak now places on all of its movie film, Eastman Keykode™ Numbers Information 44 which includes standard USS-128 Barcode 46, as shown in enlarged form in FIG. 5.

Barcodes 46 are exposed in the negative of the film during manufacture. They are located between perforations 48 and the outer edge 50 of film 40 and occur once every eight frames (2 barcodes per foot).

As Work Print 40 is synchronized to the audio in Synchronizer 18, these barcode numbers are read by barcode reader 20 and the relevant position information is added to the information contained in the database on CD 14. Since the barcode information is unique for each piece of film, the barcode information stored in the CD database can be utilized to synchronize the film to the audio. This barcode information can be utilized alone, without the biphase signal information as another means to synchronize the film and the audio, or both the barcode and biphase signal position information can be entered on the CD. Since the barcode information is unique to each piece of film, a selected reference start frame is not required (as it is when using biphase signals) since the barcode information need not be measured from any starting point.

CD 14, containing the audio files and the database of sync relationship information, can now be sent to a computer/player 36, typically in a Screening Room, where the Dailies can be viewed by projecting the Work Print film 40 while the sound is played from CD 14 in sync with the picture. The Screening Room where the Dailies are viewed, requires a CD player and computer 36 with software as well as a biphase signal generator and an optional barcode reader mounted on the projector. However, all screening rooms capable of interlocking motion picture film with perforated magnetic film, as is current practice, have adequate biphase signal generators. Computer/player 36 can receive biphase signals and/or barcode information from two or more projectors, allowing multiple Rolls to be run continuously.

Computer/player 36 is equipped to continuously read the biphase signals as the film is played on the projector equipped with the biphase signal generator. Thus, the computer always knows the exact frame of film in the lens as measured in biphase signals from the start of the Roll. If the projector is alternatively equipped with a barcode reader, the computer knows the exact frame of film in the lens in barcode location, a measurement unrelated to the start of the Roll since the barcode information is located directly on the film itself. The projector may also be equipped with both a biphase signal generator and a barcode reader. The sync relationship having been established, in order to play the film synchronized with the sound, the computer software need only collate or match up the common sync reference point information in the database to choose which audio file to play for any given Take.

It is a simple mathematical calculation for the computer to continuously synchronize the passage of film to the matching audio on the CD by counting the number of biphase signals generated from the start of the Roll and matching the measurement of biphase signals to the measurement of audio samples played. At the start of each Take and at each common sync reference point, as measured in biphase signals, the computer database provides the information as to which audio file to play, and which portion of that audio file, for the Take then appearing in the projector.

The projectionist threads the Roll of Work Print 40 into a projector and places the picture start frame in front of the projector lens. He then places CD 14 into computer/player 36 and selects the correct Virtual Roll to play from a menu appearing on computer/player 36. The biphase signal data from the projector is used to maintain synchronization utilizing the biphase signal data contained in the database on CD 14. The projectionist threads the second Roll of film into a second projector while the first Roll is playing and selects the next Virtual Roll to play from CD 14. When the first roll ends the Projectionist hits a single Change Over switch and the film in the second projector begins to play while the first projector's lens closes while the film runs out. Again, the biphase signal data from the second projector is used to maintain synchronization with the biphase signal data from the second Virtual Roll on the CD selected by the projectionist.

Another embodiment of the system is achieved by mounting a barcode reader on the film projector. Here, the barcode data which has been read by barcode reader 20, related to audio files and these relationships stored in the database on CD 14, is read from Work Print 40 as it is projected. This system automatically accesses the appropriate audio file on CD 14 by matching the unique film barcode data to the barcode data in the database on CD 14. In this embodiment, the projectionist does not have to select the proper Virtual Roll on the CD, since the barcode information read from the film allows the system to identify and select automatically the correct Virtual Roll to play.

Printed logs and reports 38 from the information in the database on CD 14 may be produced in an automated fashion by any computer equipped with the appropriate software to access the information. Such information could include the name of the project, the number of the disk, Scene and Take number, Camera Roll number, Lab Roll number, Sound Roll number, a description of the Take and the date it was shot, as well as the biphase signal and/or barcode position of the Start of each Take and the position of each common sync reference point.

When the screening of the Dailies is completed, Work Print 40 and CD 14 are ready to go to the Telecine facility, as above described. The Telecine facility is also equipped with a computer/player 36 and software. The same basic computer/player can be used in each of the three locations described above, the Screening Room model being simpler, without a data input interface or record capabilities.

There are numerous advantages, in addition to those already mentioned, to the system of this invention over the manual processs presently employed. For instance, the Stripe (Magnetic Film) presently used must be rewound six times during the synchronization procedure, whereas there is no need to rewind the CD. There is no need to use head leaders, as now used on the Stripe, or to edge code and store the Stripe, as is presently required. Synchronizing the audio on the CD to the Work Print is a much faster process than now employed, which requires manually synchronizing the Stripe to the Work Print with a splicer and tape.

The Key Code (barcode) and Acmade information is now manually logged into a log book. With Applicants' system, only the first Acmade code number is entered into the database. The Key Codes (barcodes) are then machine read, saving considerable time. When the picture and CD information is transferred to videotape in the Telecine process, the database on the CD already contains information that is currently entered manually. This also prevents human error which may occur in manually entering the data. The CD is given to the Sound Editor who can easily transfer the audio files to a computer work station for final mix preparation.

Having thus described the invention, We claim:

1. A method for adjustably synchronizing audio to film having a common audio and visual reference point comprising, transferring the audio to a digital format, selecting the position of the common audio reference point, transferring the digital audio to a computer storage device, transferring the common audio reference point position information to a database on the computer storage device, synchronizing the audio to the film by measuring the passage of the film through film measuring means, selecting the frame of film containing the common visual reference point, and transferring the common visual reference position information to the database on the computer storage device.

2. A method for adjustably synchronizing audio to film having a common audio and visual reference point, said film having a selectable reference frame comprising, transferring the audio to a digital format, selecting the position of the common audio reference point, transferring the digital audio to a portable computer storage device, transferring the common audio reference point position information to a database on the portable computer storage device, synchronizing the audio to the film by measuring the passage of the film through film measuring means commencing at the selected reference frame, identifying the position of the frame of film containing the common visual reference point, and transferring the common visual reference point position information to the database on the portable computer storage device.

3. A method for adjustably synchronizing a plurality of diverse motion picture film segments contained on a single reel of film with their matching audio files, each of said segments having its own common audio and visual sync reference point, said reel of film having a selectable reference frame comprising, transferring the audio files to a digital format, selecting the position of the common sync reference point of the audio file of each film segment, transferring the digital audio files to a portable computer storage device, transferring the common audio sync reference point position information for each audio file to a database on the portable computer storage device, synchronizing the audio files to the matching film by passing the film through film measuring means, measuring the passage of film from the selected reference frame, selecting the common visual sync reference point of each film segment and transferring the visual sync reference point information to the database on the portable computer storage device.

4. The method of claim 1, 2 or 3 wherein the means to measure the passage of the film is a biphase signal reader.

5. The method of claim 1, 2 or 3 wherein the means to measure the passage of film is a barcode reader.

6. The method of claim 1, 2 or 3 wherein the means to measure the passage of film is both a biphase signal reader and a barcode reader.

7. The method of claim 1, 2 or 3 further comprising adding a list of the audio files to the database.

8. The method of claim 1, 2 or 3 wherein the computer storage device is a compact disk.

9. The method of claim 1, 2 or 3 wherein the common audio visual sync reference point is the first frame of film in which the clapper is fully closed and the first modulation of the clapper report in the audio file.

10. The method of claim 1, 2 or 3 wherein the common audio visual sync reference point is any frame of film and any position within the audio chosen by the user.

11. A method for adjustably synchronizing a plurality of diverse motion picture film segments contained on a single reel of film with their matching audio files, each of said segments having its own common audio and visual sync reference point, said reel of film having a preselected start frame comprising, transferring the audio to a digital format, selecting the position of the common audio sync reference point of the audio file of each film segment, transferring the digital audio files to a portable computer storage device, transferring the common audio reference point postion information for each audio to a database on the portable computer storage device, synchronizing the audio files to their matching film segments by passing the film through a synchronizer having means to measure the passage of film, identifying the position of the start frame, selecting the common visual sync reference point of each film segment, measuring the position of each common visual sync reference point from the start frame and transferring the common visual sync reference point position information to the database on the portable computer storage device.

12. A method for adjustably synchronizing the daily filming of a plurality of diverse motion picture film segments contained on a single reel of film, with their matching audio files, each of said segments having its own common audio and visual sync reference point, said reel of film having a preselected start frame, comprising transferring the audio to a digital format, selecting the position of each common audio reference point of each film segment, transferring the digital audio files to a removable computer storage device, transferring the common audio reference point position information of each audio file to a database on the removable computer storage device, synchronizing the audio files to the matching film by passing the film through a synchronizer having means to measure the passage of film, and having means to input information to the database, identifying the position of the start frame, selecting the common visual sync reference frame position of each film segment, measuring the position of each common visual sync reference point from the start frame and transferring the common visual sync reference point position information to the database on the removable computer storage device.

13. The method of claim 11 or 12 wherein the means to measure the passage of the film is a biphase signal reader.

14. The method of claim 11, or 12 wherein the means to measure the passage of film is a barcode reader.

15. The method of claim 11, or 12 wherein the means to measure the passage of film is both a biphase signal reader and a barcode reader.

16. The method of claim 11 or 12 where the common audio visual sync reference point of each segment is the first frame of film of each segment in which the clapper is fully closed and the first modulation of the clapper report in each audio file.

17. The method of claim 11 or 12 further comprising adding a list of the audio files to the database.

18. The method of claim 11 or 12 wherein the removable computer storage device is a compact disk.

19. The method of claim 11 or 12 wherein the common audio visual sync reference point is any frame of film and any position within the audio chosen by the user.

20. The method of claim 11 or 12 in which the position of each common audio sync reference point is adjustable by storing an offset of the sync reference point in the database on the removable computer storage device and the position of the common visual sync reference point is adjustable by choosing the position of a new frame of film and transferring that position information to the database.

21. A method for adjustably synchronizing audio to film having a common audio and visual reference point, said film having barcode information thereon which identifies locations along the film comprising, transferring the audio to a digital format, selecting the position of the common audio reference point, transferring the digital audio to a computer storage device, transferring the common audio reference point position information to a database on the computer storage device, and synchronizing the audio to the film by passing the film through a barcode reader which measures the passage of film in barcode, selecting the frame of film containing the common visual reference point, and transferring the barcode information to the database on the computer storage device.

22. A method for adjustably synchronizing a plurality of diverse motion picture film segments contained on a single reel of film with their matching audio files, said film having barcode information thereon which identifies locations along the film, each of said film segments having its own common audio and visual sync reference point comprising, transferring the audio to a digital format, selecting the position of the common audio sync reference point of the audio file of each segment, transferring the digital audio files to a portable computer storage device, transferring the common audio sync reference point position information of each audio file to a database on the portable computer storage device, synchronizing the audio files to the matching film by passing the film through a barcode reader to read the passage of film in barcode, selecting the frame of film containing the common visual sync reference point of each film segment, and transferring the barcode position information of each common visual sync reference point to the database on the portable computer storage device.

23. A method for adjustably synchronizing the daily filming of a plurality of diverse motion picture film segments contained on a single reel of film, with their matching audio files, said film having barcode information thereon which identifies locations along the film, each of said segments having its own common audio and visual sync reference point, said reel of film having a preselected reference frame, comprising transferring the audio to a digital format, selecting the position of the common audio sync reference point of the audio file of each segment, transferring the digital audio files to a portable computer storage device, transferring the common audio sync reference point position information for each audio file to a database on the portable computer storage device, synchronizing the audio files to the matching film by placing the film in a synchronizer having a barcode reader to measure the passage of film in barcode, passing the film through the synchronizer, identifying the barcode position of the common visual sync reference frame of each film segment, and transferring the barcode position information to the database on the portable computer storage device.

24. The method of claim 21, 22 or 23 in which the passage of film is also measured by a biphase signal reader.

25. The method of claim 21, 22 or 23 further comprising adding a list of the audio files to the database.

26. The method of claim 21, 22 or 23 wherein the computer storage device is a compact disk.

27. The method of claim 21, 22 or 23 wherein the common audio visual sync reference point is the first frame of film in which the clapper is fully closed and the first modulation of the clapper report in the audio file.

28. The method of claim 21, 22 or 23 wherein the common audio visual sync reference point is any frame of film and any position within the audio file chosen by the user.

29. A system for adjustably synchronizing audio to film having a common audio and visual reference point comprising, means to transfer the audio to a digital format, means to select the position of the common audio reference point, means to transfer the digital audio to a computer storage device, means to transfer the common audio reference point position information to a database on the computer storage device, means to synchronize the audio to the film comprising means to measure the passage of film, means to select the frame of film containing the common visual reference point, and means to transfer the selected frame position information to the database on the computer storage device.

30. A system for adjustably synchronizing audio to film having a common audio and visual reference point, said film having a selectable reference frame comprising, means to transfer the audio to a digital format, means to select the position of the common audio reference point, means to transfer the digital audio to a portable computer storage device, means to transfer the common audio reference point position information to a database on the portable computer storage device, means to synchronize the audio to the film comprising means to pass the film through film measuring means commencing at the selected reference frame, means to select the frame of film containing the common visual reference point, and means to transfer the selected frame position information to the database on the portable computer storage device.

31. A system for adjustably synchronizing a plurality of motion picture film segments contained on a single reel of film with their matching audio files, each of said segments having its own common audio and visual reference point, said reel of film having a preselected reference frame comprising, means to transfer the audio to a digital format, means to select the position of the common audio sync reference point for the audio file for each segment, means to transfer the digital audio files to a portable computer storage device, means to transfer the common audio reference point position information for each audio file to a database on the portable computer storage device, means to synchronize the audio files to the matching film comprising means to measure the passage of film from the start frame, means to select the frame of film containing the common visual reference point for each segment and means to transfer the common visual reference point position information to the database on the portable computer storage device.

32. The system of claim 29, 30 or 31 wherein the means to measure the passage of the film is a biphase signal reader.

33. The system of claim 29, 30 or 31 wherein the means to measure the passage of film is a barcode reader.

34. The system of claim 29, 30 or 31 wherein the means to measure the passage of film is both a biphase signal reader and a barcode reader.

35. The system of claim 29, 30 or 31 wherein the removable computer storage device is a compact disk.

36. The system of claim 29, 30 or 31 wherein the common audio visual sync reference point is the first frame of film in which the clapper is fully closed and the first modulation of the clapper report in the audio file.

37. A system for adjustably synchronizing a plurality of diverse motion picture film segments contained on a single reel of film with their matching audio files, each of said segments having its own common audio and visual sync reference point, said reel of film having a preselected start frame comprising, means to transfer the audio to a digital format, means to select the position of the common audio reference point of the audio file for each segment, means to transfer the digital audio files to a removable computer storage device, means to transfer the common audio reference point position information for each audio file to a database on the removable computer storage device, means to synchronize the audio files to the matching film comprising means to pass the film through a synchronizer having means to measure the passage of film, means to select the position of the common visual sync reference point for each film segment and means to transfer the visual sync reference point position information to the database on the removable computer storage device.

38. A system for adjustably synchronizing the daily filming of a plurality of diverse motion picture film segments contained on a single reel of film, with their matching audio files, each of said segments having its own common audio and visual sync reference point, said reel of film having a preselected start frame, comprising means to transfer the audio to a digital format, means to select the position of the common audio sync reference point of the audio file of each segment, means to transfer the digital audio files to a removable computer storage device, means to transfer the common audio reference point position information for each audio file to a database on the removable computer storage device, means to synchronize the audio to the film comprising synchronizer means having means to measure the passage of film therethrough from the start frame, and having means to input information to the database, means to select the common visual sync reference frame of each film segment and means to transfer the common visual sync reference frame position information to the database on the removable computer storage device.

39. The system of claim 37 or 38 wherein the means to measure the passage of the film is a biphase signal reader.

40. The system of claim 37 or 38 wherein the means to measure the passage of film is a barcode reader.

41. The system of claim 37 or 38 wherein the means to measure the passage of film is both a biphase signal reader and a barcode reader.

42. The system of claim 37 or 38 wherein the removable computer storage device is a compact disk.

43. The system of claim 37 or 38 wherein the common audio visual sync reference point is the first frame of film in which the clapper is fully closed and the first modulation of the clapper report in the audio file.

44. The system of claim 37 or 38 in which the position of each common audio sync reference point is adjustable by storing an offset of the sync reference point in the database on the removable computer storage device.

45. A system for adjustably synchronizing audio to film having a common audio and visual sync reference point, said film having barcode information thereon which identifies locations along the film comprising, means to transfer the audio to a digital format, means to select the position of the common audio reference point, means to transfer the digital audio to a computer storage device, means to transfer the common audio reference point position information to a database on the computer storage device, means to synchronize the audio to the film comprising means to pass the film through barcode reader means to measure the passage of film in barcode, means to select the frame of film containing the common visual sync reference point, and means to transfer the barcode information to the database on the computer storage device.

46. A system for adjustably synchronizing a plurality of motion picture film segments contained on a single reel of film with their matching audio files, said film having barcode information thereon which identifies locations along the film, each of said film segments having its own common audio and visual reference point, said reel of film having a preselected reference frame comprising, means to transfer the audio to a digital format, means to select the position of the common audio sync reference point of the audio file of each segment, means to transfer the digital audio files to a portable computer storage device, means to transfer the common audio sync reference point position for each audio file to a database on the portable computer storage device, means to synchronize the audio files to the matching film comprising means to pass the film through a barcode reader to measure the passage of film in barcode from the reference frame, means to select the frame of film containing the common visual sync reference point of each film segment, and means to transfer the barcode information to the database on the portable computer storage device.

47. The system of claim 45 or 46 also comprising a biphase signal reader to measure the passage of the film.

48. The system of claim 45 or 46 wherein the removable computer storage device is a compact disk.

49. The system of claim 45 or 46 wherein the common audio visual sync reference point is the first frame of film in which the clapper is fully closed and the first modulation of the clapper report in the audio file.

50. The system of claim 45 or 46 in which the position of each common audio sync reference point is adjustable by storing an offset of the sync reference point in the database on the removable computer storage device.

51. A motion picture projection system having a projector for projecting the visual images from a reel of motion picture film having a plurality of diverse film segments contained thereon each of said segments having its own audio file and its own common audio and visual sync reference point, comprising film measuring means adapted to measure the passage of film through the projector, a digital audio computer storage device on which is stored the matching audio file for each film segment and a database containing the position of the common audio and visual sync reference point for each segment, means to synchronously play each digital audio file with its matching film segment comprising means to transfer the measurement of the passage of film through the projector to computer means adapted to select and play the matching audio file for each segment by reading the position of the frame of film containing the common visual reference point for each film segment and selecting the matching audio file from the common sync position information stored in the database.

52. The method of claim 51 wherein the means to measure the passage of the film is a biphase signal generator.

53. The method of claim 51 wherein the means to measure the passage of film is a barcode reader.

54. The method of claim 51 wherein the means to measure the passage of film is both a biphase signal generator and a barcode reader.

* * * * *